United States Patent
Vermuelen et al.

(10) Patent No.: US 11,420,388 B2
(45) Date of Patent: Aug. 23, 2022

(54) BUILD PLATFORM GUIDING ARRANGEMENT FOR AN ADDITIVE MANUFACTURING APPARATUS

(71) Applicants: CSIR, Pretoria (ZA); Aerosud Innovation Centre (Pty) Ltd., Centurion (ZA)

(72) Inventors: Marius Vermuelen, Pretoria (ZA); Johannes Paulus Bothma, Waverly (ZA)

(73) Assignees: CSIR, Pretoria (ZA); AHRLAC INNOVATION CENTRE (PTY) LTD., Gauteng (ZA)

( * ) Notice: Subject to any disclaimer, the term of this patent is extended or adjusted under 35 U.S.C. 154(b) by 53 days.

(21) Appl. No.: 16/756,641

(22) PCT Filed: Oct. 17, 2018

(86) PCT No.: PCT/IB2018/058042
§ 371 (c)(1),
(2) Date: Apr. 16, 2020

(87) PCT Pub. No.: WO2019/077513
PCT Pub. Date: Apr. 25, 2019

(65) Prior Publication Data
US 2020/0282645 A1   Sep. 10, 2020

(30) Foreign Application Priority Data
Oct. 17, 2017   (ZA) .................................. 2017/07000

(51) Int. Cl.
*B29C 64/245*   (2017.01)
*B33Y 30/00*    (2015.01)
*B29C 64/153*   (2017.01)

(52) U.S. Cl.
CPC .......... *B29C 64/245* (2017.08); *B29C 64/153* (2017.08); *B33Y 30/00* (2014.12)

(58) Field of Classification Search
CPC ........................... B29C 64/245; B29C 64/153
(Continued)

(56) References Cited

U.S. PATENT DOCUMENTS

2008/0199240 A1 * 8/2008 Verlinden ................ B41J 13/28
                                                                    400/622
2016/0001507 A1   1/2016 Hartmann
(Continued)

FOREIGN PATENT DOCUMENTS

EP           3159143      4/2017
WO   WO-2017168548 A1 * 10/2017 .............. B22F 12/00

*Primary Examiner* — Leith S Shafi
*Assistant Examiner* — Xinwen Ye
(74) *Attorney, Agent, or Firm* — Allen, Dyer, Doppelt & Gilchrist, P.A.

(57) ABSTRACT

The invention relates to an additive manufacturing apparatus which includes a platform guiding arrangement 10 having a build platform 12 and a mounting arrangement 14 comprising guiding elements 16, 18 mounted to the build platform 12. The mounting arrangement 14 is configured to permit displacement of the build platform 12 in a vertical or Z direction whilst permitting unconstrained thermal expansion and contraction of the build platform in the horizontal or X-Y plane. The guide elements 16, 18 abut against adjacent sides of the build platform 12 to inhibit angular displacement about a vertical axis and permit unconstrained thermal expansion and contraction in the X-Y plane.

14 Claims, 13 Drawing Sheets

(58) Field of Classification Search
USPC .......................................................... 425/375
See application file for complete search history.

(56) References Cited

U.S. PATENT DOCUMENTS

| | | |
|---|---|---|
| 2016/0052205 A1 | 2/2016 | Frantzdale |
| 2016/0052207 A1* | 2/2016 | Bloom .................. B29C 64/118 |
| | | 425/3 |
| 2016/0059308 A1* | 3/2016 | Volk ........................ B22F 10/28 |
| | | 428/615 |
| 2016/0114533 A1 | 4/2016 | Grasegger |
| 2016/0169821 A1* | 6/2016 | Meyer ..................... G01N 25/72 |
| | | 264/40.1 |
| 2017/0313049 A1* | 11/2017 | Colchester ............ B29C 64/245 |
| 2018/0222115 A1* | 8/2018 | Watanabe ............. G03G 15/224 |
| 2018/0354034 A1* | 12/2018 | Vaes ..................... B29C 64/393 |

\* cited by examiner

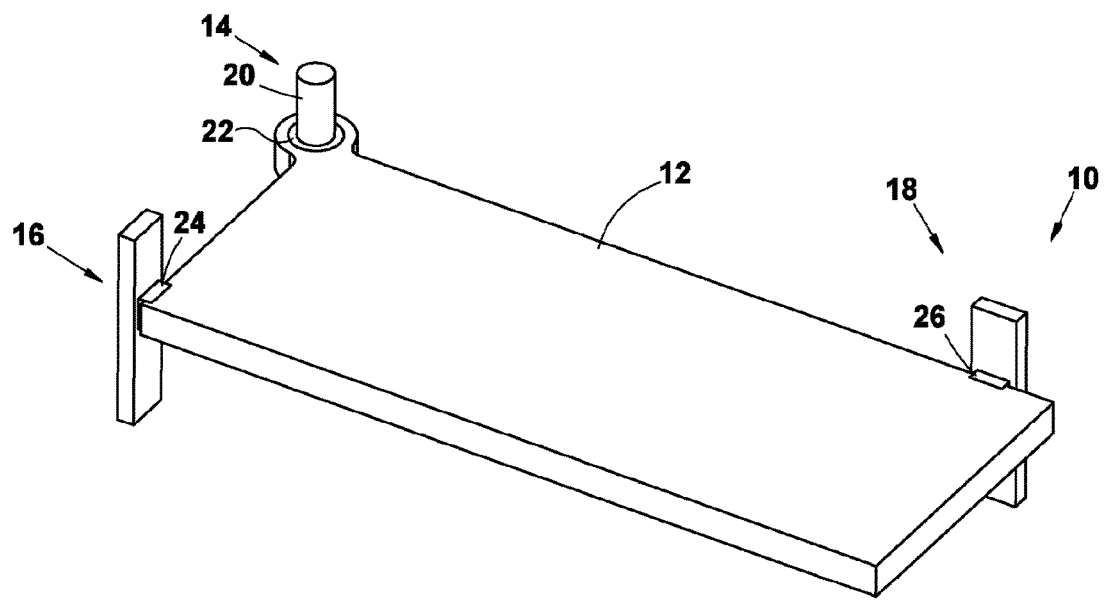
Figure 1
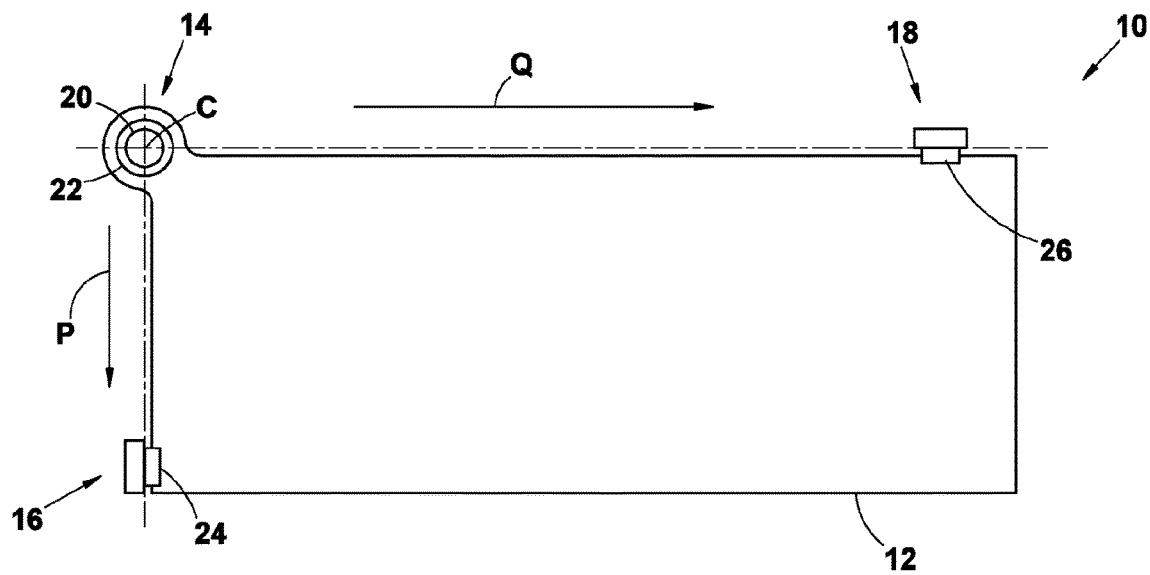
Figure 2
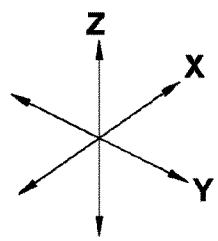

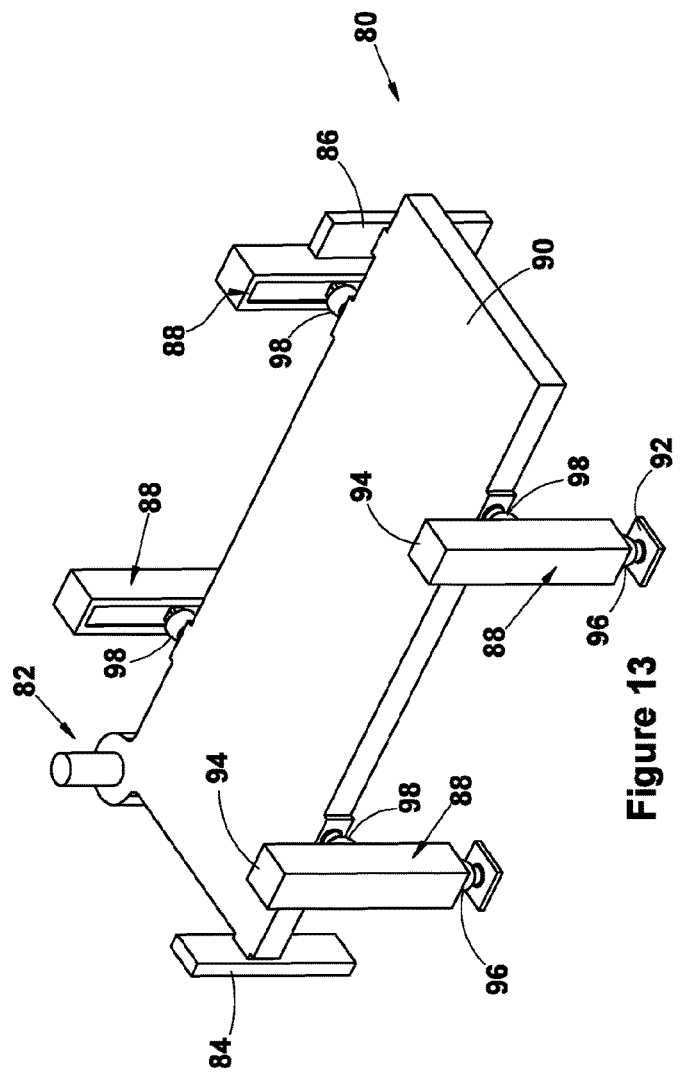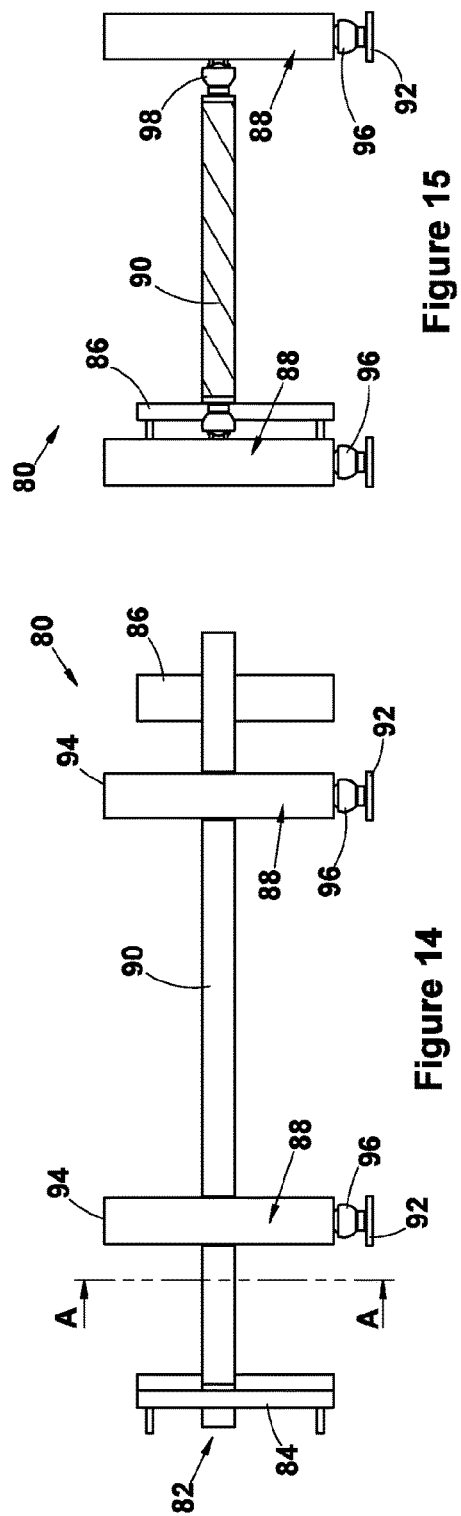

BUILD PLATFORM GUIDING ARRANGEMENT FOR AN ADDITIVE MANUFACTURING APPARATUS

This application is the § 371 National Stage of International Application No. PCT/IB2018/058042, filed on Oct. 17, 2018, which claims the benefit of South African Application Serial No. 2017/07000, filed on Oct. 17, 2017, the contents of which applications are hereby incorporated by reference in their entirety.

FIELD OF THE INVENTION

This invention relates, broadly, to additive manufacturing. More particularly, the invention relates to a build platform guiding arrangement for an additive manufacturing apparatus. The invention also relates to an additive manufacturing apparatus including such a build platform guiding arrangement and to a method of supporting a build platform of an additive manufacturing apparatus.

BACKGROUND OF THE INVENTION

The term "additive manufacturing" (AM) refers to various processes used to synthesise a three-dimensional object (hereafter simply referred to as an "object" or "part"). Certain AM techniques are sometimes referred to as "3D printing".

In AM, parts are typically manufactured by digitally slicing a three-dimensional computer-aided design (CAD) model into two-dimensional layers or images. These layers are then manufactured by curing, consolidating, melting or otherwise forming these layers from a raw material, typically in the form of a powder or fluid.

In the Inventors' experience, AM generally provides a number of advantages over traditional manufacturing methods. These advantages include the ability to manufacture highly complex parts which allows for weight reduction, integration of more functionality into parts and part count reduction. The process also obviates the need for tooling, leading to cost and/or material saving.

A number of AM processes employ an energy source in the form of a high energy beam (e.g. laser or electron beam) to melt or sinter powdered material in a material bed in layers to ultimately form a desired part. These processes are hereinafter jointly referred to as "powder bed fusion processes".

In powder bed fusion processes, the energy source is directed by a scanning unit, based on the geometry of a CAD model, to ensure that the desired layers are formed. The material bed is supported on a build platform which is incrementally lowered in one direction (hereinafter generally referred to as "the Z-direction") as each new layer of the object is formed. A fresh layer of material is then added to the material bed before the next layer is scanned.

A number of AM processes also require some form of preheating to be carried out. Preheating strategies are employed to elevate the temperature of raw material before consolidating the raw material into a final form. Preheating may be used in an attempt to ensure that material is more easily processed and/or processed at a higher rate, or to remove moisture from the material prior to consolidation. The presence of moisture may lead to porosity and/or other defects in the object.

Further, when producing AM parts using energy beams, residual stresses form in the material due to solidification shrinkage of the weld pool. In certain materials, these residual stresses are relatively high and, when producing larger parts, can cause the parts to distort and/or crack. Material can be preheated and the rate of cooling controlled to reduce or relieve such stresses.

In existing AM systems, a build platform is typically mounted to an actuating arrangement, e.g. one or more electrically driven linear actuators located below the build platform, which enables the build platform to be incrementally moved in the Z-direction, thereby permitting the incremental deposition of fresh layers of raw material onto the build platform.

Furthermore, the build platform is typically configured to move within a material retaining unit or housing. As the build platform moves incrementally in the Z-direction, a material deposition arrangement deposits new layers of material onto the build platform, thereby essentially filling the material retaining unit with material. Preheating is conducted either by heating the build platform itself, by heating the material retaining unit or by heating the material deposited on the build platform from the top.

To ensure high accuracy of parts, it is important to guide the build platform along its path in a sufficiently precise manner. Certain AM systems rely on the actuating arrangement to guide the build platform, while other AM systems employ dedicated guiding systems.

The Inventors have found that known AM systems are generally effective and sufficiently accurate when the build platform is relatively small, i.e. when the build platform defines a generally small area in a horizontal or a X-Y plane. For example, in a typically "small" implementation, the AM system may have major build platform dimensions of about 300 mm×300 mm and operate at temperatures of up to 200° C. However, the Inventors believe that known AM systems face a number of issues when relatively large build platforms are employed at higher temperatures due to the effects of thermal expansion.

When operating at relatively high temperatures, thermal expansion of AM apparatus components and in particular the build platform may cause distortion, mechanical jamming, failures of the actuating arrangement, and the like. Certain materials require relatively high preheating temperatures to reduce residual stresses in parts and to inhibit crack-forming. The required preheating temperature is material dependent and can range from a few hundred degrees Celsius to more than 1000° C. As an example, a 1 m long titanium grade 5 baseplate may increase 5.5 mm or more in length when preheated at 600° C.

In cases where a relatively small build platform is employed, a single, central actuator or guide pillar may be used to displace the build platform. Such configurations typically perform relatively well under high temperatures, as the effects of thermal expansion on the single central actuator or pillar are not substantial. However, these configurations do not provide enough structural support for larger build platforms.

The Inventors have found that the effects of thermal expansion are amplified when the size of the build platform is increased. In cases where a relatively large build platform is employed, a plurality of actuators or guide pillars is typically employed. For instance, the build platform may be rectangular in bottom view, with an actuator being provided at or towards each of the four bottom corners of the build platform to support and displace the build platform. The Inventors have found that such configurations may be affected by thermal expansion to a significant extent, as thermal expansion of the build platform may more easily cause the guide pillars or actuators to distort, jam and/or fail.

Thermal stresses induced in the build platform when it is constrained by the actuating arrangement may cause the build platform itself to become distorted. A distorted build platform may make it impossible to produce a powder layer of uniform thickness at the start of the additive manufacturing process. This could result in failure of a build due to delamination from the build platform.

The present invention aims to address the issues identified above, at least to some extent.

SUMMARY OF THE INVENTION

According to one aspect of the invention there is provided an additive manufacturing apparatus which includes a build platform which is configured to be displaced along a vertical or Z-axis of the additive manufacturing apparatus and a build platform guiding arrangement including:

mounting means positioned at or near an extremity of the build platform in a horizontal or X-Y plane defined by an X-axis and a Y-axis of the additive manufacturing apparatus, wherein the mounting means is configured operatively to permit displacement of the build platform along the Z-axis and prevent substantial linear displacement of the build platform along the X-axis and/or the Y-axis relative to the mounting means; and guiding means configured operatively to permit unconstrained thermal expansion and contraction of the built platform in the X-Y plane and prevent substantial angular displacement of the build platform about the Z-axis in the X-Y plane.

The mounting means may include a pillar which operatively extends along the Z-axis of the additive manufacturing apparatus.

The mounting means may be a mounting arrangement provided by a pillar and bush arrangement or pillar and bearing arrangement by which the build platform is mounted in the additive manufacturing apparatus in order to prevent the build platform from being displaced in the X-Y plane relative to the mounting arrangement.

In some embodiments, the pillar may be fixedly mounted in the additive manufacturing apparatus, with the bush being mounted to the build platform and being configured to be displaced along with the build platform. In other embodiments, the bush may be fixedly mounted in the additive manufacturing apparatus, with the pillar configured to be displaced along with the build platform.

The build platform may be generally rectangular in the X-Y plane. In some embodiments, the mounting element may be positioned at a corner or corner region of the build platform. In some embodiments, the mounting element may be positioned centrally along a side or end of the build platform.

The guiding means may include two guiding elements, each located at or near a respective corner region of the build platform.

In another embodiment the guiding means may include two guiding elements, each located centrally along an opposing side or end of the build platform.

In one embodiment the mounting means is mounted at a first corner region, a first of the guiding elements is mounted at a second corner region on a side of the build platform adjacent to the first corner region, and a second of the guiding elements is mounted at a third corner region on another side of the build platform adjacent to the first corner region.

Each guiding element may include or be provided by a linear guide which extends along the Z-axis and which substantially abuts a side surface of the build platform to prevent angular displacement of the build platform, in use, the linear guide being fixedly mounted in the additive manufacturing apparatus.

Each guiding element may further include a surface plate provided on the side surface of the build platform. In some embodiments, the surface plate does not form part of the guiding element and instead forms part of the build platform. The surface plate may be configured to mate with a corresponding linear guide in a sliding fashion, in use.

An interface between the linear guide and its corresponding surface plate may be aligned with a centre of the mounting means along the X-axis or Y-axis, as the case may be. The centre of the mounting means may be a centre point of the guide pillar in the X-Y plane.

In other embodiments, the surface plate may be fixedly mounted in the additive manufacturing apparatus, with the linear guide configured to be displaced along with the build platform.

The build platform guiding arrangement may further include a displacement arrangement configured to displace the build platform along the Z-axis of the additive manufacturing apparatus. The displacement arrangement may include at least two spaced apart linear actuators. The linear actuators may be angularly displaceable and/or include angularly displaceable components in order operatively to compensate for thermal expansion or contraction of the build platform to maintain the build platform in a generally parallel orientation relative to the X-Y plane.

One or both ends of each linear actuator may include or be mounted to angularly displaceable joints.

The build platform guiding arrangement may include three or more linear actuators of the type described above. In one embodiment, the build platform guiding arrangement may include four linear actuators arranged so as to define four corners of a rectangle when the guiding arrangement is viewed from the bottom.

The linear actuators may have opposed ends, a first end of each linear actuator may be mounted to a support structure (e.g. a lower region of the additive manufacturing apparatus) and second end of the linear actuator may be mounted to a bottom of the build platform.

The second end of the linear actuator may protrude above the build platform, with a side of the linear actuator being attached to the build platform by way of an angularly displaceable component, e.g. a joint.

The build platform may be a primary build platform which defines a working area of the additive manufacturing apparatus, in use.

Alternatively, the build platform may be a secondary build platform which is mounted or mountable to a primary build platform. In such cases, a primary build platform is also provided, in use, and the linear actuators are directly coupled to the secondary build platform and are configured to displace the primary build platform by displacing the secondary build platform.

The primary build platform may have dimensions different from the dimensions of the secondary build platform.

A material retaining unit may further be provided. The material retaining unit may include a plurality of walls which are configured to conform closely to outer side edges of the primary build platform so as to retain a material bed operatively deposited in the working area defined by the primary build platform.

The primary build platform may be spaced apart from the secondary build platform along the Z-axis of the additive manufacturing apparatus, i.e. the primary build platform may be located above the secondary build platform. The secondary build platform may in turn be located above the actuating arrangement. At least one heating and/or cooling unit may be provided in a space defined between the platforms. Thermal insulation and/or a sensor arrangement (e.g. temperature sensors) may also be provided in the space.

The primary and second build platforms may operatively be mounted such that they are substantially parallel to each other and to the X-Y plane.

According to another aspect of the invention there is provided an additive manufacturing apparatus, which includes a displacement arrangement which includes at least two linear actuators configured to displace a build platform of the additive manufacturing apparatus along a Z-axis of the additive manufacturing apparatus, wherein the linear actuators are angularly displaceable and/or include angularly displaceable components in order operatively to compensate for thermal expansion or contraction of the build platform to maintain the build platform in a generally parallel orientation relative to an X-Y plane defined by an X-axis and a Y-axis of the additive manufacturing apparatus.

The linear actuators may be angularly displaceable in an X-Z plane defined by the X-axis and the Z-axis of the additive manufacturing apparatus and/or in a Y-Z plane defined by a Y-axis and the Z-axis of the additive manufacturing apparatus in order operatively to maintain the build platform in a generally parallel orientation relative to the X-Y plane.

The additive manufacturing apparatus typically further includes:
- at least one material deposition arrangement for depositing layers of material in a working area of the additive manufacturing apparatus to form a material bed;
- at least one material feeding mechanism for feeding material into the material deposition arrangement; and
- a scanning unit spaced operatively above the working area, the scanning unit configured to provide an energy beam for consolidating material deposited in the material bed.

According to yet another aspect of the invention, there is provided a method of supporting a build platform of an additive manufacturing apparatus in a manner which compensates for thermal expansion of the build platform, which method includes:
- providing a vertical guide at a periphery of the build platform along which the build platform is displaceable; and
- inhibiting angular displacement of the build platform about the vertical guide and permitting unconstrained thermal expansion and contraction of the build platform in a horizontal plane.

Displacement of the build platform may be affected by at least two linear actuators, each actuator having two connection regions, one of which is connected to a support structure and the other of which is connected to the build platform, the method including connecting the connection regions of the actuator to the support structure and the build platform such that they are angularly displaceable relative to the support structure and build platform to compensate for relative lateral movement between the ends of the actuator as a result of differential thermal expansion of the build platform and the support structure.

BRIEF DESCRIPTION OF THE DRAWINGS

The invention will now be further described, by way of example, with reference to the accompanying conceptual drawings.

In the drawings:

FIG. 1 shows a three-dimensional view of an embodiment of a build platform guiding arrangement for an additive manufacturing apparatus according to the invention;

FIG. 2 shows a top view of the build platform guiding arrangement of FIG. 1;

FIG. 13 shows a three-dimensional view of another embodiment of a build platform guiding arrangement for an additive manufacturing apparatus according to the invention;

FIG. 14 is a side view of the build platform guiding arrangement of FIG. 13;

FIG. 15 is a sectional view of the build platform guiding arrangement of FIG. 13, taken along the line A-A in FIG. 14;

DETAILED DESCRIPTION WITH REFERENCE TO THE DRAWINGS

Figure 3:
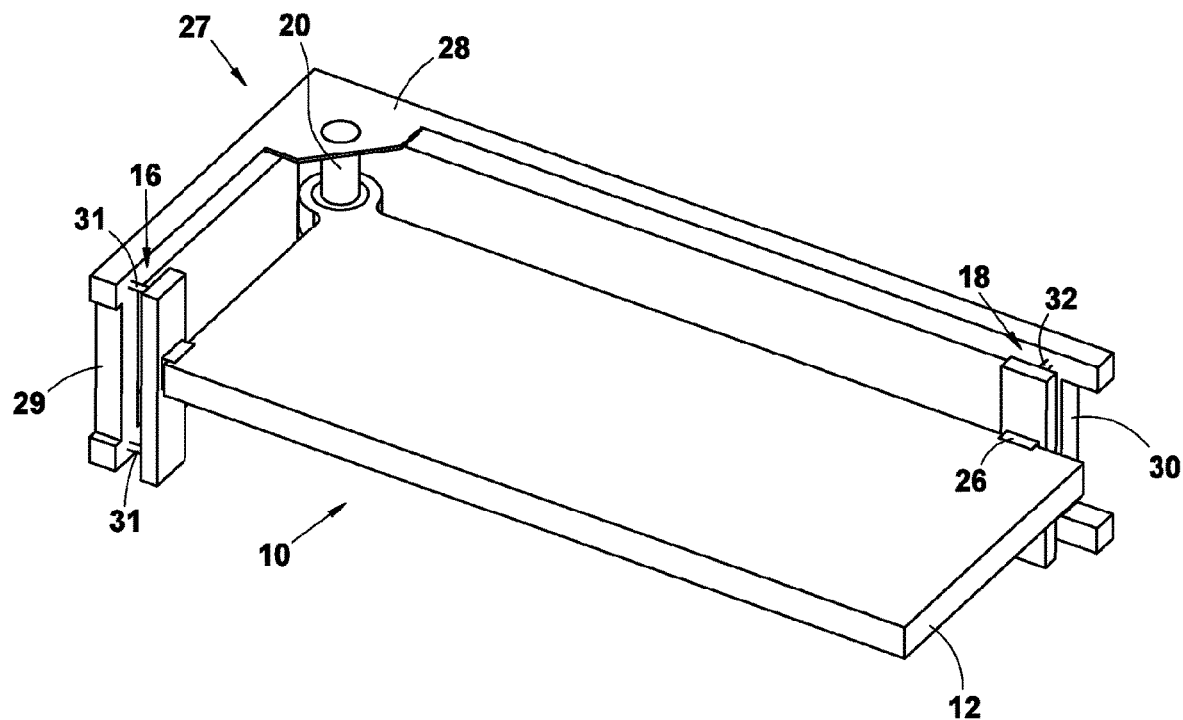
FIG. 3 shows a further three-dimensional view of the build platform guiding arrangement of FIG. 1, wherein a frame of the additive manufacturing apparatus is also shown.
Figure 4:
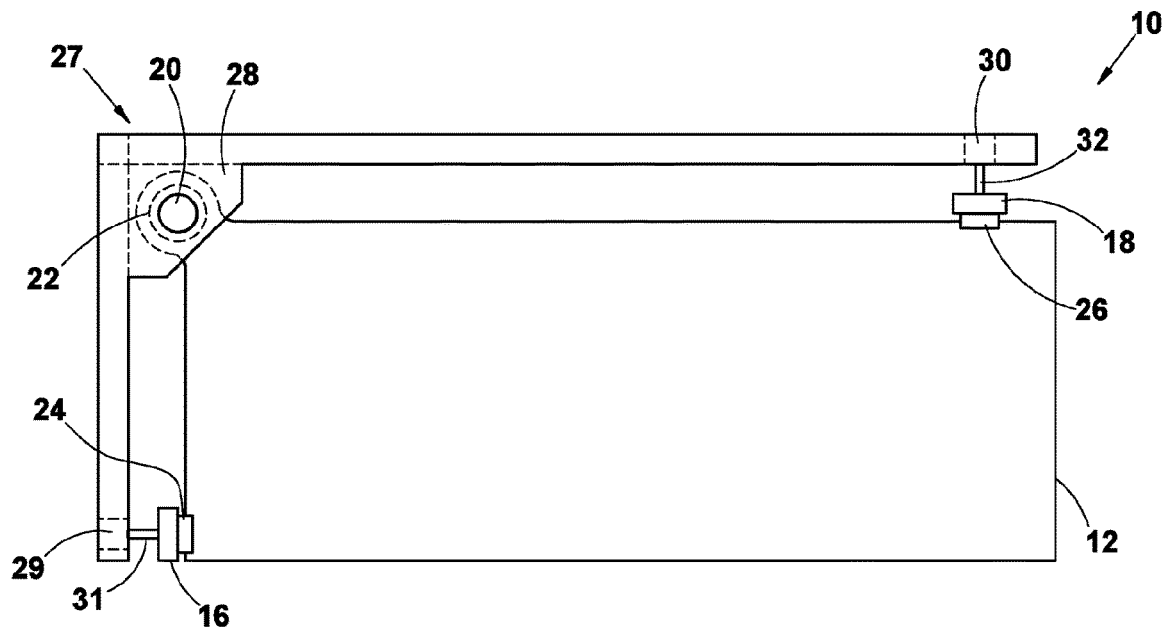
FIG. 4 is a top view of the build platform guiding arrangement and frame of FIG. 3.

The following description of the invention is provided as an enabling teaching of the invention. Those skilled in the relevant art will recognise that many changes can be made to the embodiments described, while still attaining the beneficial results of the present invention. It will also be apparent that some of the desired benefits of the present invention can be attained by selecting some of the features of the present invention without utilising other features. Accordingly, those skilled in the art will recognise that modifications and adaptations to the present invention are possible and can even be desirable in certain circumstances, and are a part of the present invention. Thus, the following description is provided as illustrative of the principles of the present invention and not a limitation thereof.

An embodiment of a build platform guiding arrangement 10 forming part of an additive manufacturing apparatus according to the invention is illustrated in FIGS. 1 to 4. The build platform guiding arrangement 10 includes a mounting means in the form of a mounting arrangement 14 and two guiding elements 16, 18. The mounting arrangement 14 is mounted to a build platform 12.

The build platform 12 is generally planar and rectangular in an X-Y plane of an additive manufacturing apparatus (not shown) in which the guiding arrangement 10 is operatively installed. The build platform 12 is configured to be displaced along a vertical or Z-axis of the additive manufacturing apparatus in use. The axes X, Y and Z are indicated in FIG. 1.

The mounting arrangement 14 is provided by a pillar and bush or bearing arrangement 20, 22 mounted to a corner region of the build platform 12. The pillar 20 is configured to be fixedly mounted in the additive manufacturing apparatus such that it extends along the Z-axis, while the bush 22 is mounted concentrically about the pillar 20 and is configured to be vertically displaced together with the build platform 12, in use.

The mounting arrangement 14 serves to permit displacement of the build platform 12 along the Z-axis, while preventing substantial linear displacement of the build platform 12 along the X-axis or Y-axis relative to the pillar 20.

The guiding elements 16, 18 are provided by elongate linear guides which are rectangular in cross-section. The guiding elements 16, 18 are configured to be fixedly mounted in the additive manufacturing apparatus such that their lengths extend along the Z-axis and such that they abut different side surfaces of the build platform 12.

Each guiding element 16, 18 is located near a respective corner region of the build platform 12. As illustrated in FIG. 1, the mounting arrangement 14 is mounted to a first corner region of the build platform 12, a first of the guiding elements 16 is mounted such that one of its sides abuts a second corner region on a side of the build platform 12 adjacent to the first corner region, and a second of the guiding elements 18 is mounted such that one of its sides abuts a third corner region on another side of the build platform 12 adjacent to the first corner region.

In this embodiment, surface plates 24, 26 are provided on the side surfaces of the build platform 12. Each surface plate 24, 26 has an exterior face which is configured to abut against a corresponding one of the guiding elements 16, 18 to facilitate sliding motion of the build platform 12 along the lengths of the guiding elements 16, 18. A material with anti-frictional properties at high wear and high temperature conditions, such as aluminium bronze, may be used in the surface plates 24, 26.

An interface between each guiding element 16, 18 and its corresponding surface plate 24, 26 in the X-Y plane is aligned with a centre point "C" of the pillar 20, as is clear from FIG. 2.

In use, the fixedly mounted guiding elements 16, 18 guide the build platform 12 accurately along the Z-axis. The guiding elements 16, 18 serve to prevent angular displacement of the build platform 12 about the Z-axis (in the X-Y plane) while permitting unconstrained thermal expansion/contraction in the X and Y directions (indicated by the arrows "P" and "Q" in FIG. 1).

The guiding elements 16, 18 and surface plates 24, 26 permit thermal expansion of the build platform 10 by providing a sliding surface between each guiding element 16, 18 and its corresponding surface plate 24, 26 in the X-Z or Y-Z plane, as the case may be.

In order further to illustrate the embodiment of FIGS. 1 and 2, FIGS. 3 and 4 additionally illustrate a frame 27 of the additive manufacturing apparatus to which the guiding arrangement 10 is mounted. The frame 27 is configured to remain stationary, in use.

The pillar 20 is mounted to a pillar support formation 28 in a corner region of the frame 27 and the guiding elements 16, 18 are mounted to guiding support formations 29, 30 in adjacent corner regions of the frame 27 by way of set screws 31, 32. The set screws 31, 32 permit accurate alignment of the build platform 12, in use.

Figure 5:
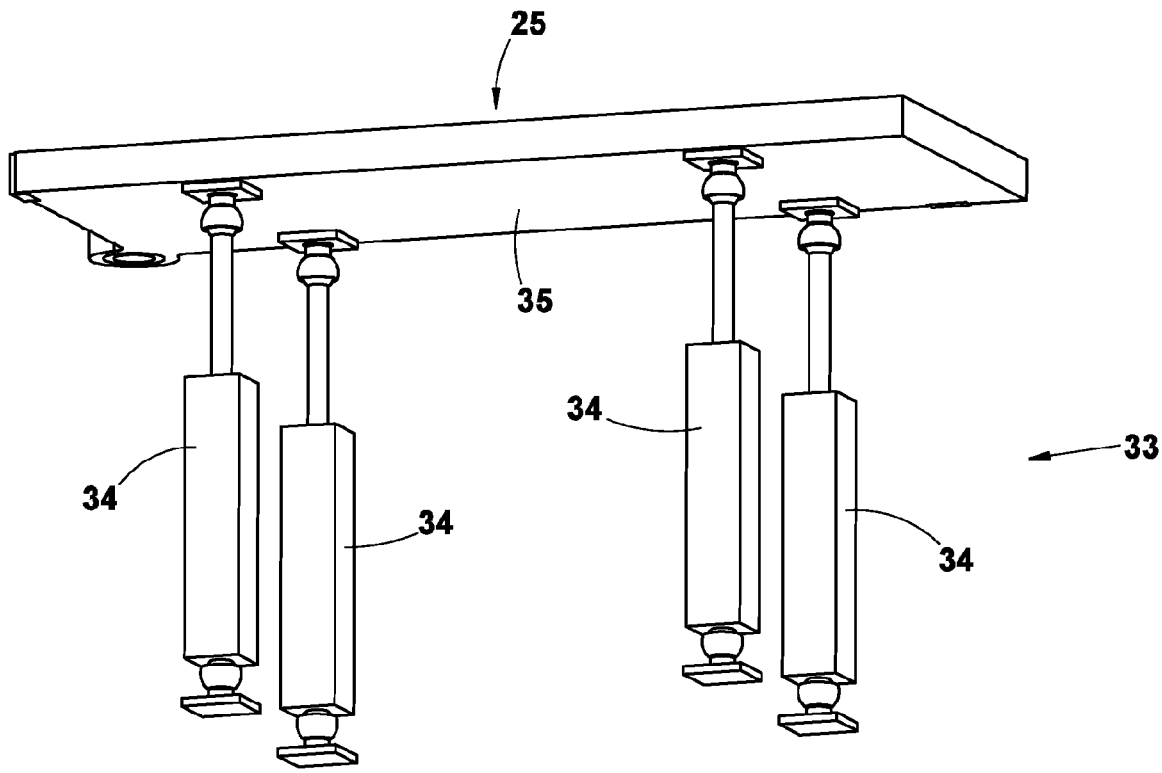
FIG. 5 is a three-dimensional view of an embodiment of a displacement arrangement for a build platform guiding arrangement according to the invention.
Figure 6:
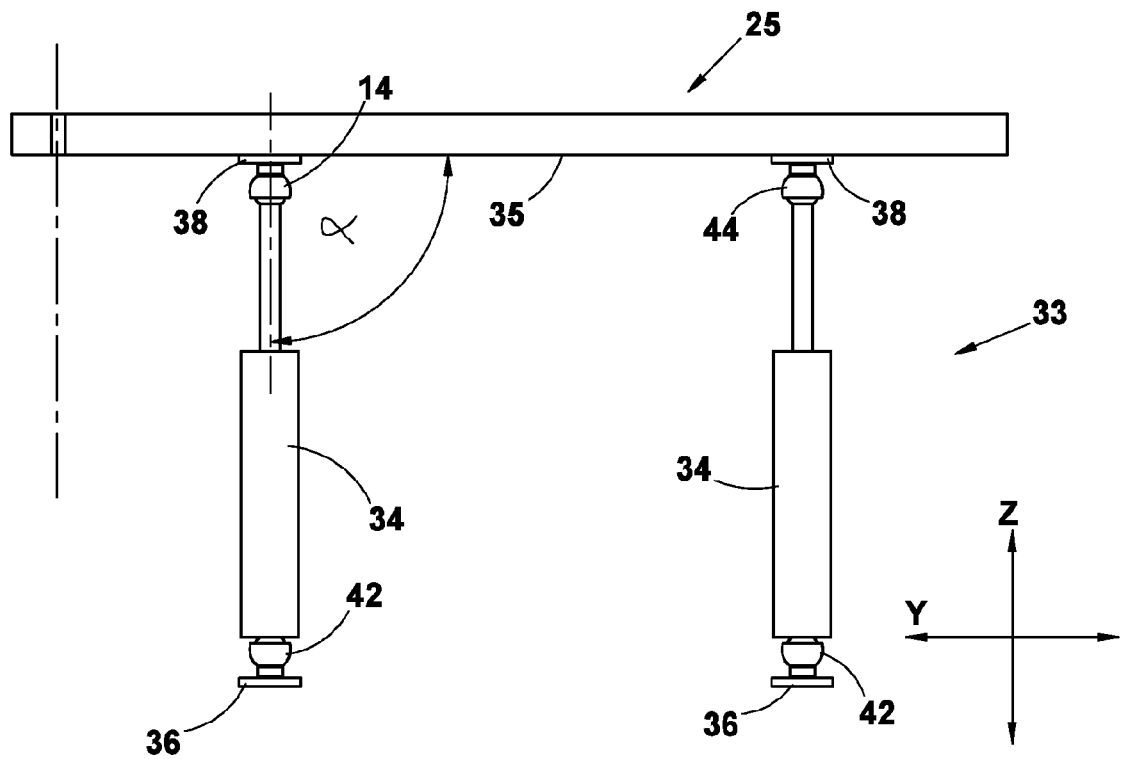
FIG. 6 is a side view of the displacement arrangement of FIG. 5.

FIGS. 5 and 6 illustrate a displacement arrangement 33 which may provide a build platform guiding arrangement according to the invention or which may form part of a build platform guiding arrangement according to the invention, e.g. the guiding arrangement 10.

The displacement arrangement 33 is configured to displace a build platform 25 of an additive manufacturing apparatus along the Z-axis of the additive manufacturing apparatus. In this embodiment, the displacement arrangement 33 includes four linear actuators 34 which operatively actuate and support the build platform 25. The linear actuators 34 are arranged at the bottom of the build platform 25 so as to form four corners of a rectangle, when the displacement arrangement 33 is viewed from the bottom, thereby supporting the entire length and width of the build platform.

Each linear actuator 34 has opposed ends. The linear actuator 34 includes a first end 36 which is configured to be mounted to a support structure in the form of a lower region of the additive manufacturing apparatus, e.g. an apparatus base (not shown), and a second end 38 which is mounted to a bottom surface 35 of the build platform 25.

Each end 36, 38 of the linear actuator 34 is provided with an angularly displaceable joint 42, 44. In this embodiment, the joints 42, 44 are ball joints.

As mentioned above, the linear actuators 34 are configured to displace the build platform 25 along the Z-axis of the additive manufacturing apparatus. Additionally, the linear actuators 34 are angularly displaceable by means of the joints 42, 44 in order operatively to compensate for thermal expansion or contraction of the build platform 25 to maintain the build platform 25 in a generally parallel orientation relative to the X-Y plane.

In a first position shown in FIGS. 5 and 6, the linear actuators 34 extend along the Z-axis and there is thus a 90 degree angle between the length of each linear actuator 34 and the build platform 25, as indicated by the angle α in FIG. 6.

Figure 7:
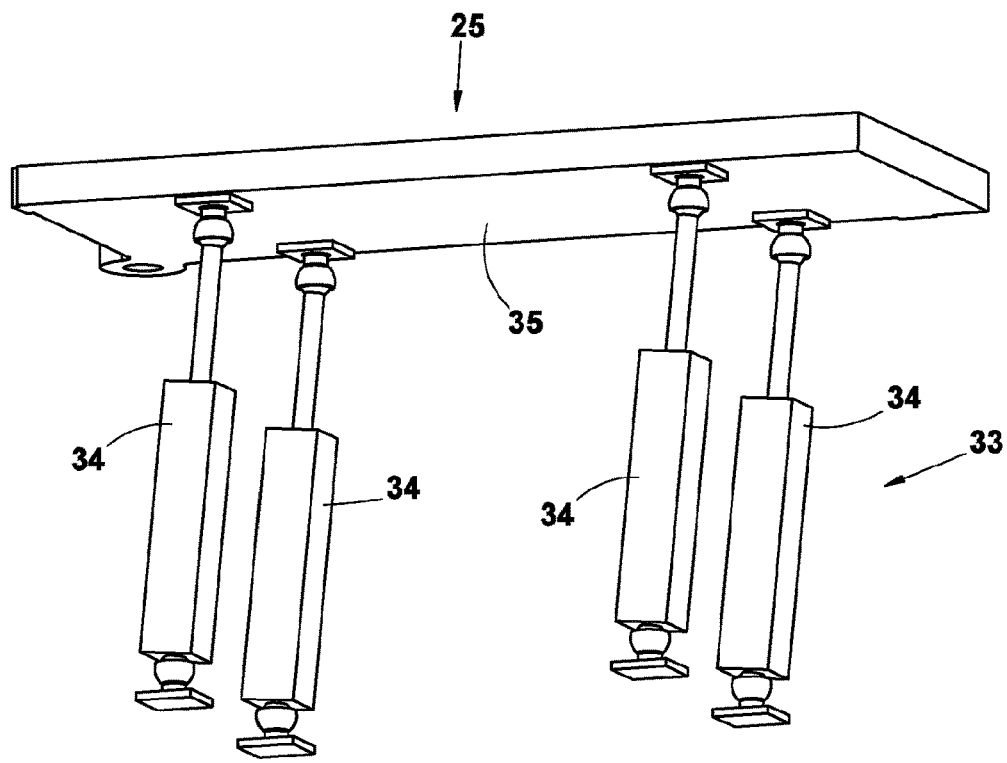
FIG. 7 is a further three-dimensional view of the displacement arrangement of FIG. 5, illustrating the effects of thermal expansion in an exaggerated manner.
Figure 8:
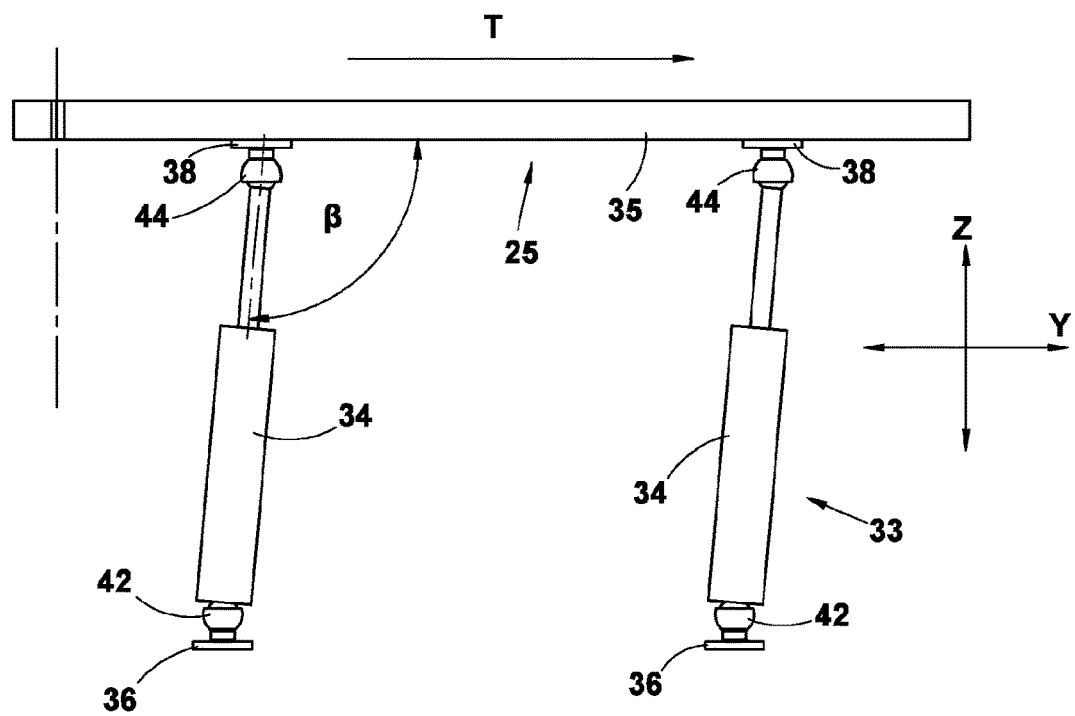
FIG. 8 is a further side view of the displacement arrangement of FIG. 5, illustrating the effects of thermal expansion in an exaggerated manner.
Figure 9:
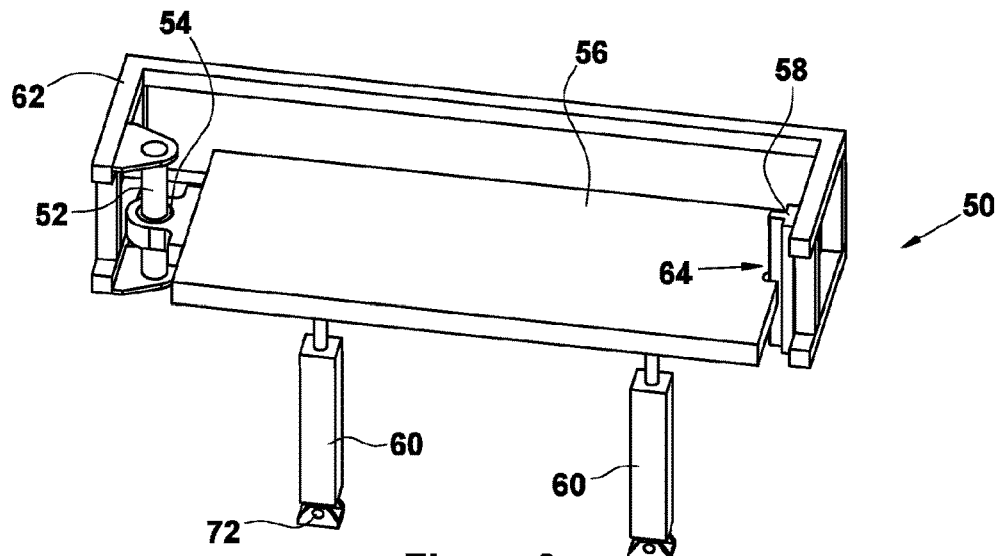
FIG. 9 shows a three-dimensional view of another embodiment of a build platform guiding arrangement for an additive manufacturing apparatus according to the invention, wherein a frame of the additive manufacturing apparatus is also shown.
Figure 10:
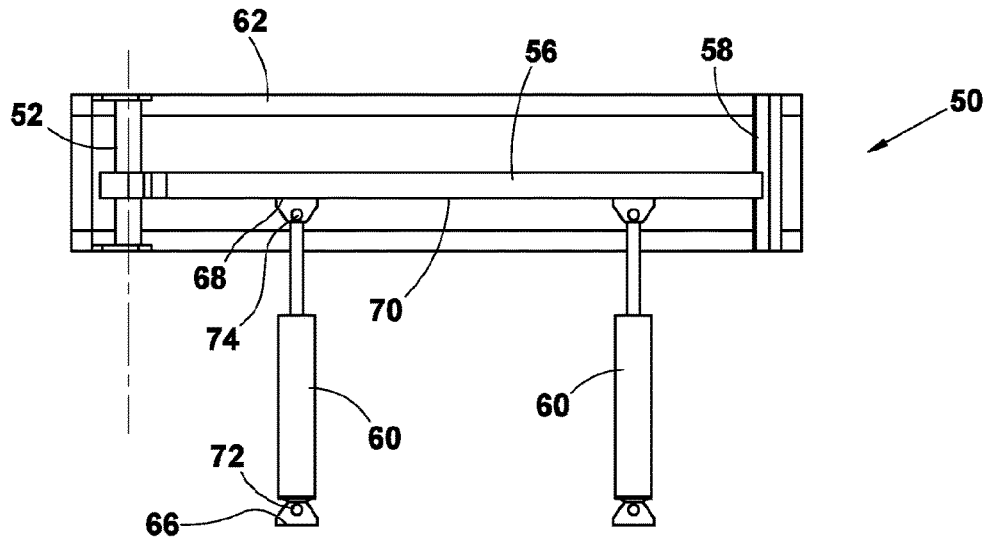
FIG. 10 is a side view of the build platform guiding arrangement of FIG. 9.

In a second position shown in FIGS. 7 and 8, thermal expansion of the build platform 25 has taken place, as indicated by the directional arrow "T" in FIG. 8. To compensate for relative lateral movement between the ends 36, 38 of the actuators 34 as a result of differential thermal expansion of the build platform 25 and the support structure to which the ends 36, 38 are mounted, the actuators 34 are angularly displaced by way of the joints 42, 44, thereby maintaining the build platform 25 in an orientation generally parallel relative to the X-Y plane (i.e. in a horizontal orientation).

In the second position, therefore, there is a non-perpendicular angle between the base 25 and the length of each actuator 34 when viewed in the Y-Z plane, as indicated by the angle β in FIG. 8. It will be appreciated that the extent of the angular displacement of the actuators 34 will vary, with the actuator 34 which is furthest from the pillar 20 experiencing the largest angular displacement. Although this may cause the base 25 to be at a slanted angle instead of being in a horizontal position, the Inventors have found that this deviation is typically within acceptable tolerance values.

It will be understood by those of ordinary skill in the art that the thermal expansion shown in FIGS. 7 and 8, and thus the angle β, is exaggerated in order to illustrate the principle of operation of the actuators 34, and that the angle β may thus typically be closer to 90 degrees than the angle illustrated in the drawings.

The Inventors have found that, in some embodiments, the actuators 34 may move up to 0.25 degrees as a result of thermal expansion. Each actuator 34 may be mounted at a relatively small negative angle when at room temperature (e.g. at a negative angle of 0.25°) to compensate for the angular displacement to which that specific actuator will be subjected in use. This may ensure that the actuators are vertically oriented when at operating conditions (e.g. 600° C.) and that the build platform is thus horizontal.

Another embodiment of a build platform guiding arrangement 50 according to the invention is shown in FIGS. 9 to 12. This embodiment may provide similar functionality or achieve similar results to the embodiments described with reference to FIGS. 1 to 8.

In this embodiment, a pillar 52 and bush 54 arrangement is provided centrally along one end of the build platform 56 and a single guiding element 58 is provided centrally along an opposing end of the build platform 56. Furthermore, the guiding arrangement 50 includes only two linear actuators 60.

The pillar 52 is mounted to one end of a frame 62 of an additive manufacturing apparatus (not shown), while the guiding element 58 is mounted to an opposing end of the frame 62.

In this embodiment, the guiding element 58 is elongate and T-shaped in cross-section. A wider side, or base, of the guiding element 58 is mounted to the frame 62 and a narrower side, or protrusion, of the guiding element 58 mates with a complementally shaped recess 64 in the corresponding end of the build platform 56.

The length of the narrow side or protrusion of the guiding element 58 and the depth of the recess 64 will be selected such that the build platform 56 may expand and contract in the X-direction without the free end of the narrow side or protrusion coming into contact with a root or base of the recess 64 to ensure that they remain in sliding engagement. With this arrangement, the build platform 56 can expand and contract in the Y-direction and the X-direction in an unconstrained manner.

Each linear actuator 60 has opposed ends. The linear actuator 60 includes a first end 66 which is configured to be mounted to a support structure in the form of a lower region of the additive manufacturing apparatus, e.g. an apparatus base (not shown), and a second end 68 which is mounted to a bottom surface 70 of the build platform 56.

Each end 66, 68 of the linear actuator 60 is provided with an angularly displaceable joint 72, 74. In this embodiment, the joints 72, 74 are single axis pivot joints. The joints 72, 74 are pivotable in the Y-Z plane.

Figure 11:
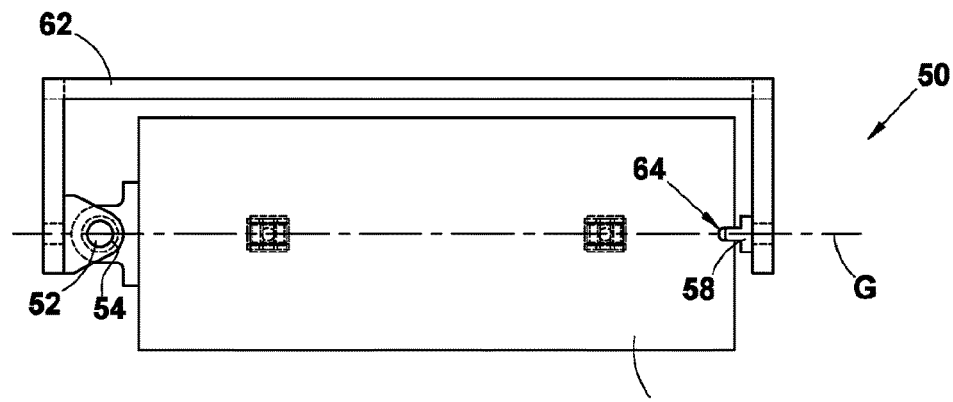
FIG. 11 is a top view of the build platform guiding arrangement of FIG. 9.

The pillar 52, the linear actuators 60, the recess 64 and the guiding element 58 are aligned along a centre line "G" of the guiding arrangement 50, as shown in FIG. 11. The depth of the recess 64 will be sufficient to compensate for the thermal expansion of the build platform 56.

Figure 12:
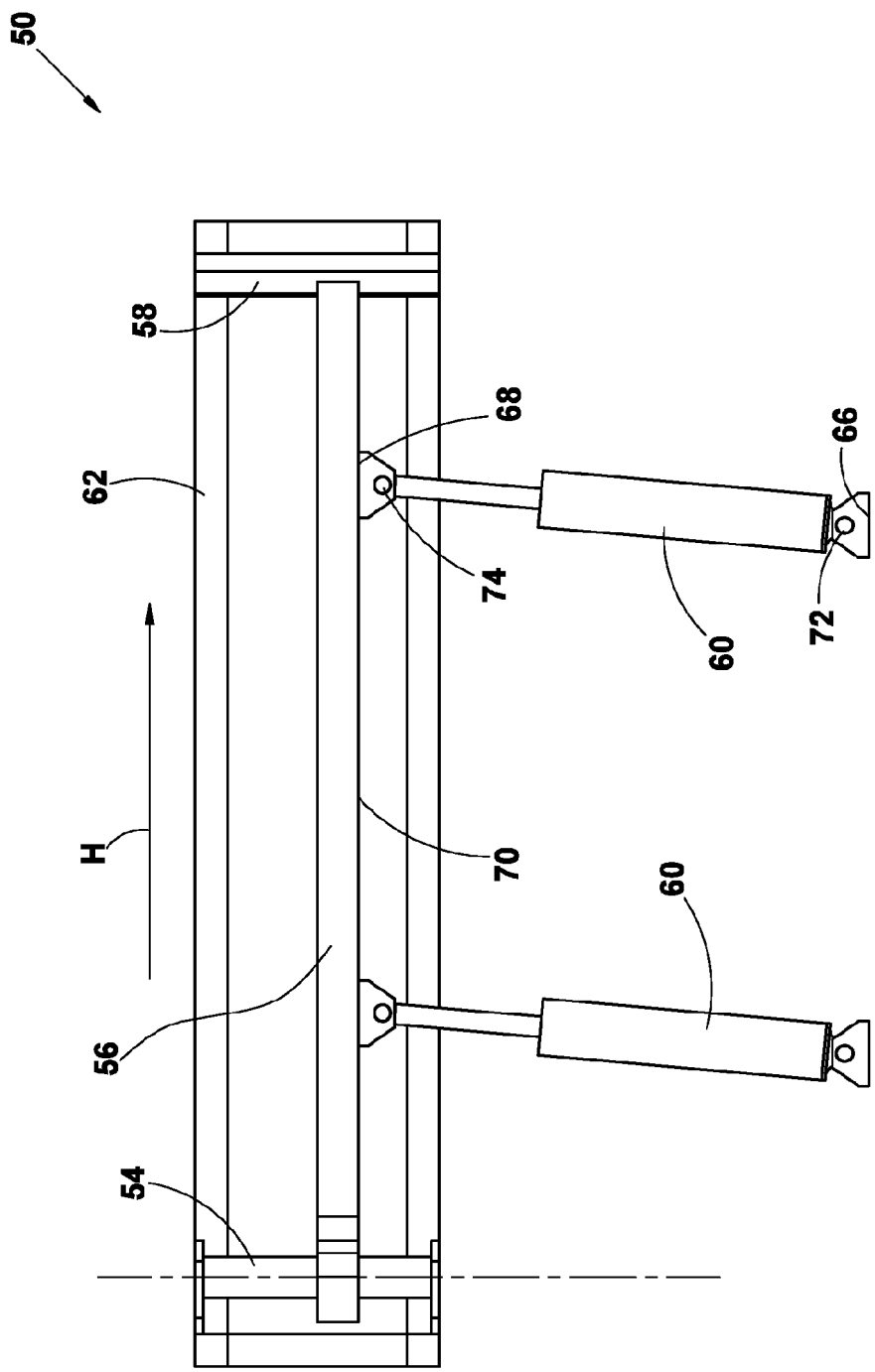
FIG. 12 is a further side view of the build platform guiding arrangement of FIG. 9, illustrating the effects of thermal expansion in an exaggerated manner.

It will again be understood that the thermal expansion shown in FIG. 12 (indicated by the directional arrow "H") is exaggerated in order to illustrate the principle of operation of the actuators 60.

Another embodiment of a build platform guiding arrangement 80 according to the invention is shown in FIGS. 13 to 15. This embodiment may provide similar functionality or achieve similar results to the embodiments described with reference to FIGS. 1 to 12.

The guiding arrangement 80 includes a mounting arrangement 82 and two guiding elements 84, 86 similar to those described with reference to FIGS. 1 to 4.

The guiding arrangement 80 includes four linear actuators 88. Two linear actuators 88 are provided on each side of the build platform 90, as is best shown in FIG. 13. In this embodiment, each linear actuators 88 is configured to displace the build platform along the Z-axis by way of a lead screw and nut arrangement (not shown) forming part of the linear actuator 88. It is envisaged that rack and pinion arrangements may be used instead of lead screw and nut arrangements to provide a similar configuration to the one illustrated in FIGS. 13 to 15.

Each linear actuator 88 includes a first end 92 which is configured to be mounted to a support structure in the form of a lower region of the additive manufacturing apparatus, e.g. an apparatus base (not shown), and a second end 94 which protrudes above the build platform 90.

The first end 92 of each linear actuator 88 is provided with a ball joint 96, while a side of the actuator 88 is connected to the build platform 90 by way of a further ball joint 98. The ball joint 96 and the ball joint 98 are oriented generally transversely relative to each other, as is best shown in FIG. 15. The ball joint 98 is configured to be displaced along the Z-axis together with the build platform 90, in use.

The Inventors have found that the configuration of FIGS. 13 to 15 may reduce the overall height of a build platform guiding arrangement and/or additive manufacturing apparatus.

Figure 16:
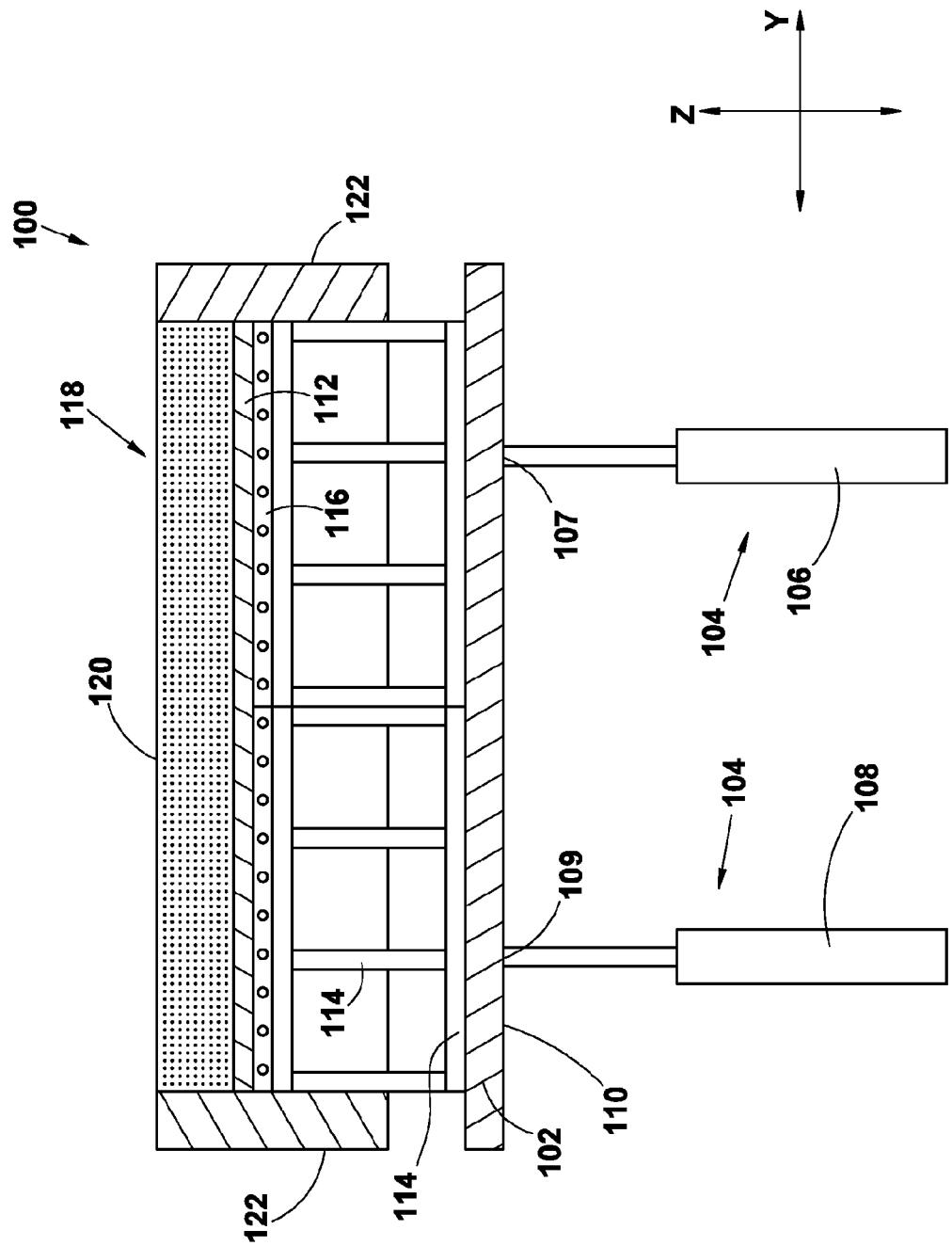
FIG. 16 shows a sectional view of an example of a build platform configuration in which a build platform guiding arrangement of the present invention can be employed.

FIG. 16 illustrates an example of a build platform configuration 100 in which a build platform guiding arrangement of the present invention can be employed.

The build platform configuration 100 includes a secondary build platform, or base 102, which is attached to a conventional actuating arrangement 104.

The actuating arrangement 104 is provided by two electrically driven linear actuators 106, 108 located below the base 102. Supporting ends 107, 109 of the actuators 106, 108 are directly connected to a bottom surface 110 of the base 102.

In use, linear motion of the actuators 106, 108 causes vertical displacement of the base 102, i.e. displacement along a Z-axis of an additive manufacturing apparatus in which the build platform configuration 100 is installed.

A primary build platform 112 is mounted to the base 102 by a mounting structure 114. In this embodiment, the mounting structure 114 is in the form of a steel frame, which is bolted onto the base 102. A heating assembly 116 is provided on top of the mounting structure 114. The primary build platform 112 is thus attached to the mounting structure 114 via the heating assembly 116.

It is envisaged that, in other embodiments, the mounting structure may be bolted or clamped directly to the primary build platform. A connection mechanism between the mounting structure and the primary build platform may permit adjustment by means of set screws, to ensure that the primary build platform can be aligned appropriately relative to other components of the additive manufacturing apparatus.

In use, vertical displacement of the base 102 causes displacement of the primary build platform 112.

The primary build platform 112 can be displaced downwardly incrementally to permit fresh layers of raw material to be deposited in a working area 118 it defines, thereby to form a material bed 120.

At least one material deposition arrangement (not shown) is typically provided for depositing the layers of material, with a suitable feeding mechanism being included for feeding material into the material deposition arrangement. Raw material may be consolidated using a high energy beam, directed by a scanning unit (not shown), as will be well understood by those of ordinary skill in the art.

A material retaining unit 122 is provided. The material retaining unit 122 includes a plurality of walls which are configured to conform closely to outer side edges of the primary build platform 112 so as to retain the material bed 120 operatively deposited in the working area 118.

The primary and secondary build platforms 102, 112 are mounted such that they are parallel to each other and to the X-Y plane.

In order to compensate for the effects of thermal expansion, the mounting arrangement 14 and guiding elements 16, 18 of the build platform guiding arrangement 10 described with reference to FIGS. 1 to 4 can be incorporated into the configuration 100 by mounting them relative to the base 102. Additionally, the actuating arrangement 104 can be replaced with the displacement arrangement 33 described with reference to FIGS. 5 to 8. Such an exemplary embodiment is illustrated in FIGS. 17 to 19 and is generally indicated by reference numeral 130.

Figure 17:
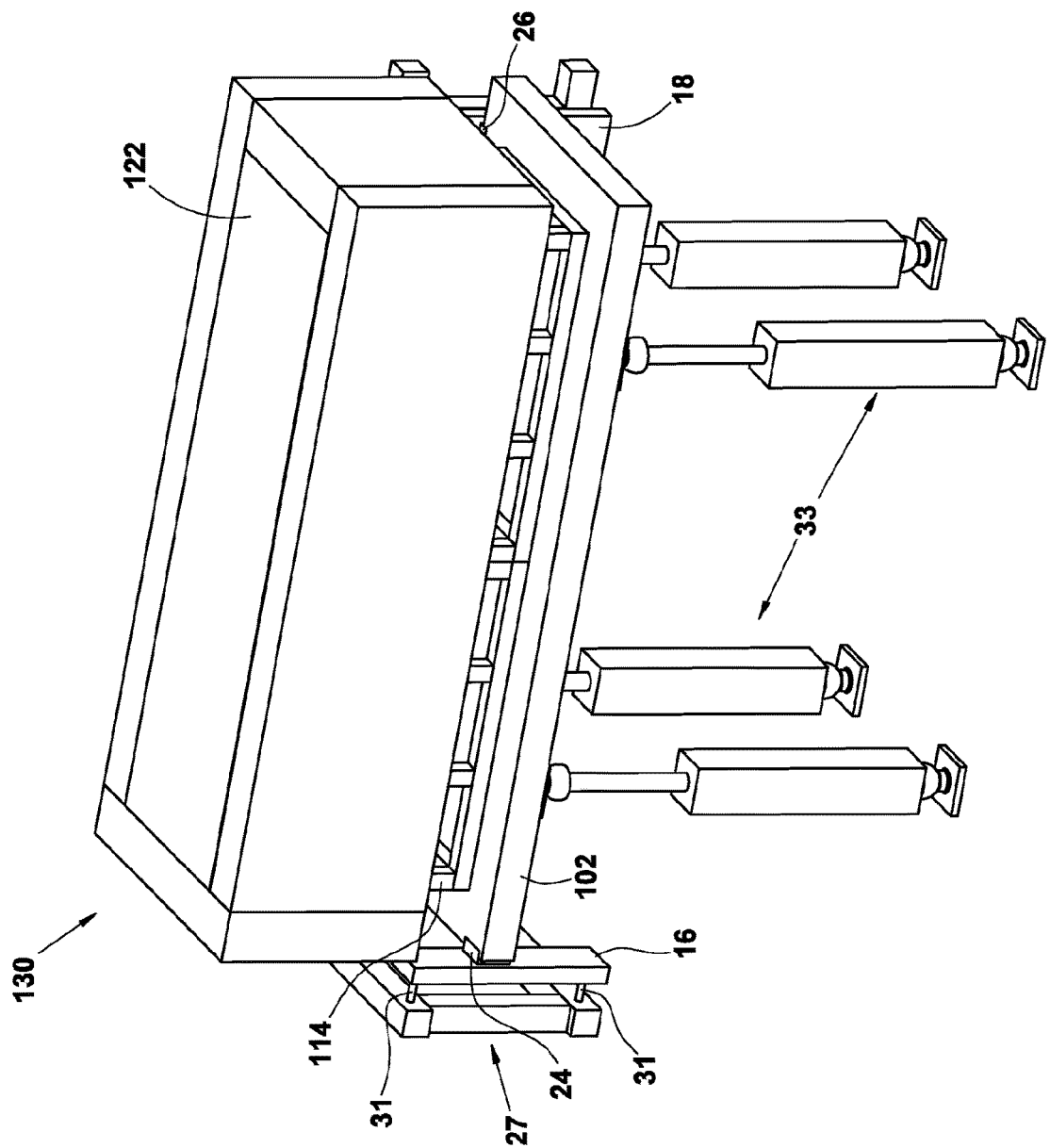
FIG. 17 shows a three-dimensional view of the build platform configuration of FIG. 16, in which an embodiment of a build platform guiding arrangement according to the invention is installed.
Figure 18:
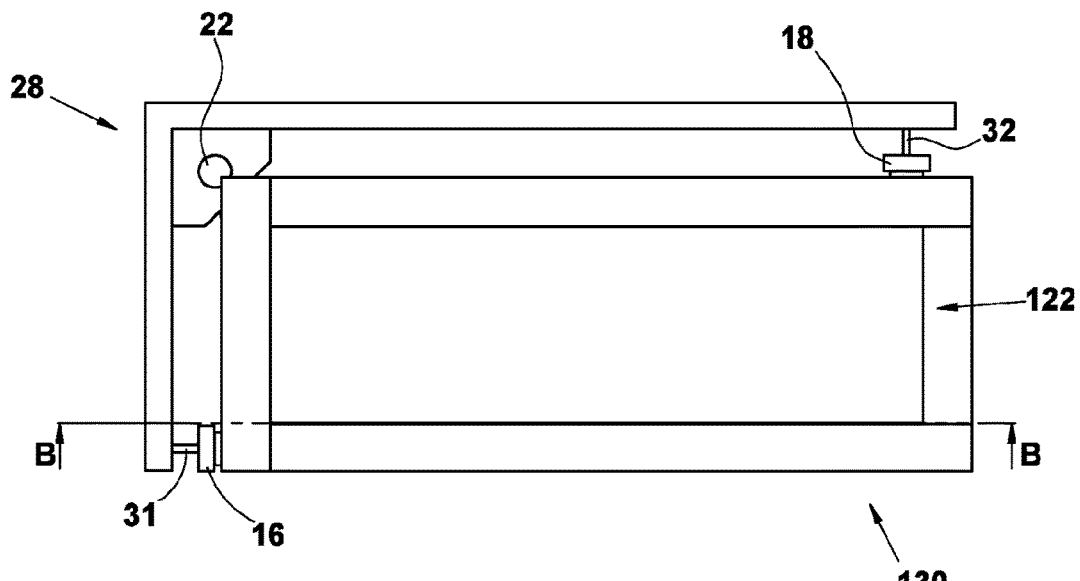
FIG. 18 shows a top view of the configuration of FIG. 17.
Figure 19:
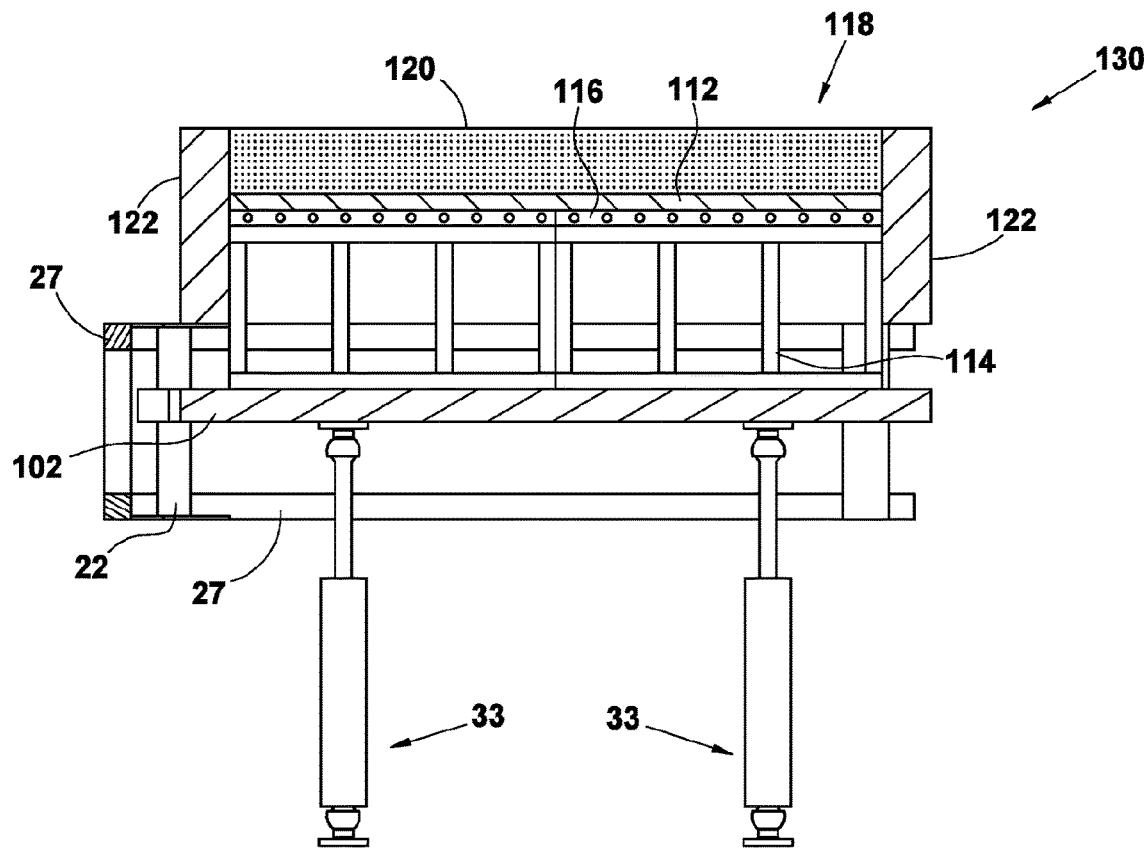
FIG. 19 shows a sectional view of the configuration of FIG. 17, taken along the line B-B in FIG. 18.

As shown in FIGS. 17 to 19, the build platform guiding arrangement 10 would typically be incorporated into the base 102 and not the primary build platform 112 to prevent the guiding arrangement 10 from interfering with the material retaining unit 122. However, in certain alternative configurations a guiding arrangement may be mounted directly to a primary build platform, i.e. a build platform defining an additive manufacturing apparatus' working area.

FIGS. 20 to 24 illustrate another embodiment of a build platform guiding arrangement 140 for an additive manufacturing apparatus according to the invention. This embodiment may provide similar functionality or achieve similar results to the embodiments described above.

This embodiment is conceptually similar to the embodiments described with reference to FIGS. 1 to 8. However, in this embodiment, the pillar 142 and guiding elements 144, 146 are mounted to the build platform 148 in a movable manner (along the Z-axis), while the bush or bearing 150 and the surface plates 152 and 154 are mounted to a frame 156 of the additive manufacturing apparatus in a fixed manner.

The guiding elements 144, 146 are mounted to a bottom surface 163 of the build platform 148 by way of generally triangular flanges or gussets 158, 160. In use, the guiding elements 144, 146 slidingly engage the plates 152, 154 to guide the build platform 148 accurately along the Z-axis. The guiding elements 144, 146 serve to prevent angular displacement of the build platform 148 about the Z-axis (in the X-Y plane) while permitting unconstrained thermal expansion/contraction in the X and Y directions.

Figure 20:
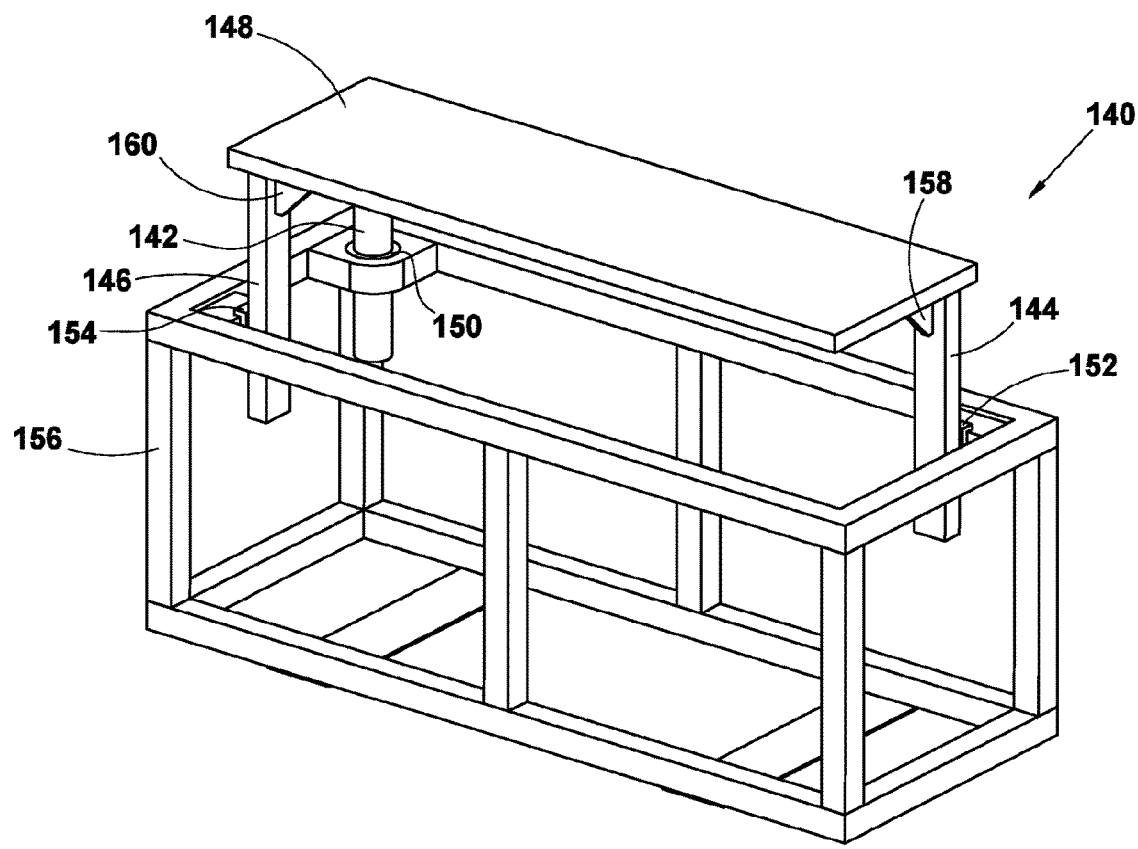
FIG. 20 shows a three-dimensional view of another embodiment of a build platform guiding arrangement for an additive manufacturing apparatus according to the invention, wherein a frame of the additive manufacturing apparatus is also shown.
Figure 21:
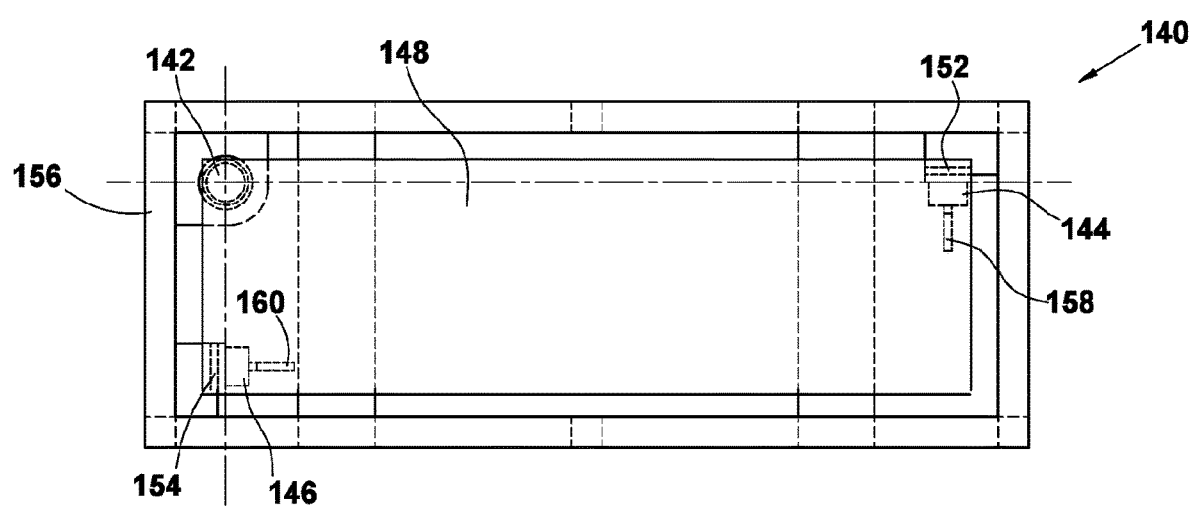
FIG. 21 shows a top view of the build platform guiding arrangement and frame of FIG. 20.
Figure 22:
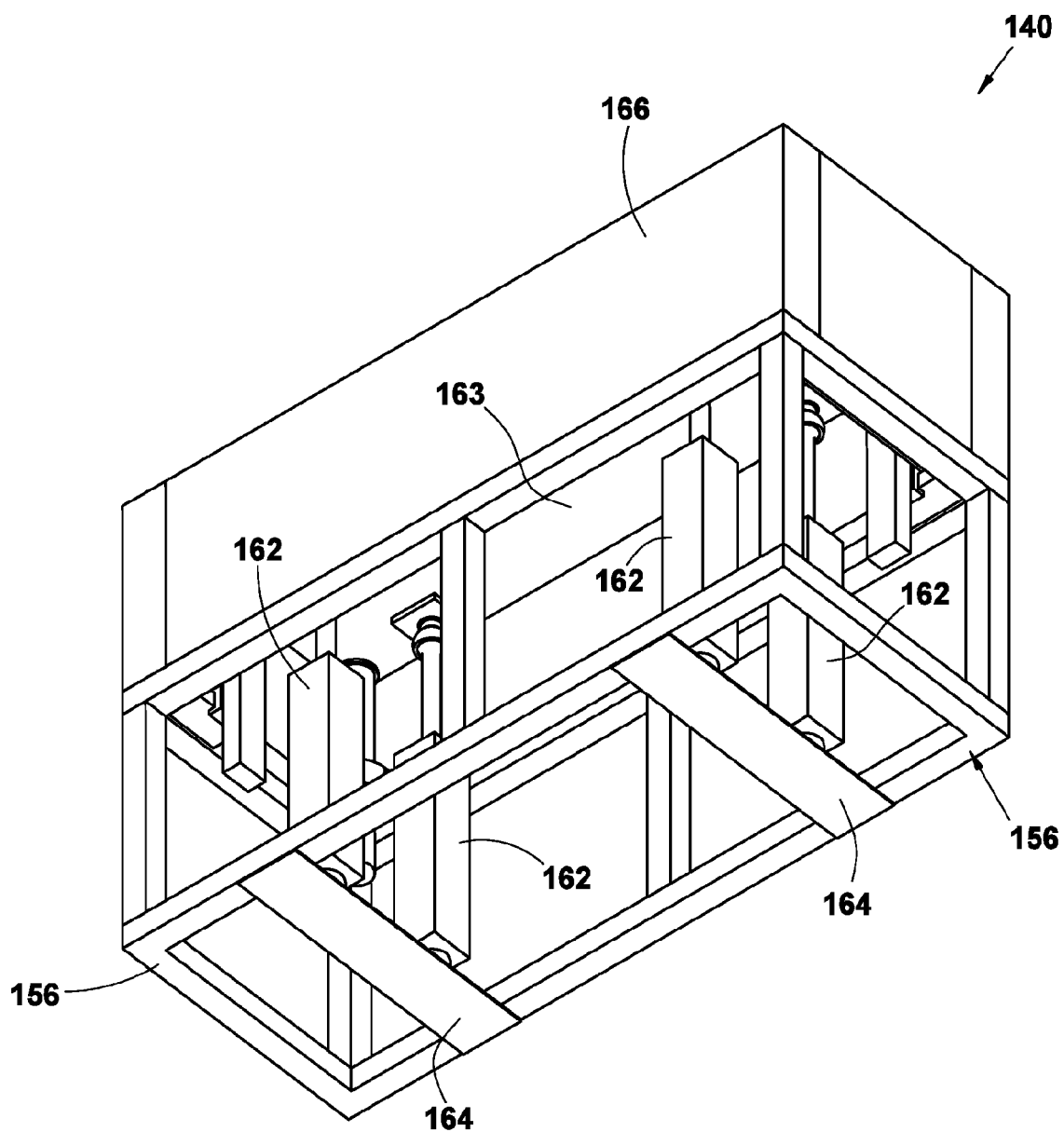
FIG. 22 shows another three-dimensional view of the build platform guiding arrangement and frame of FIG. 20, wherein a material retaining unit of the additive manufacturing apparatus and a displacement arrangement of the build platform guiding arrangement are also shown.
Figure 23:
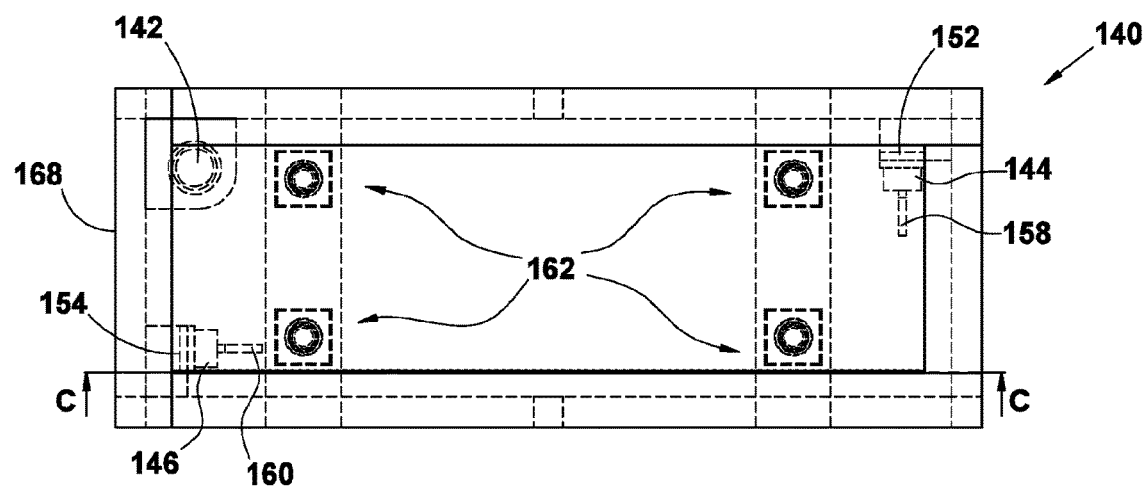
FIG. 23 shows a top view of the build platform guiding arrangement, frame and material retaining unit of FIG. 22.
Figure 24:
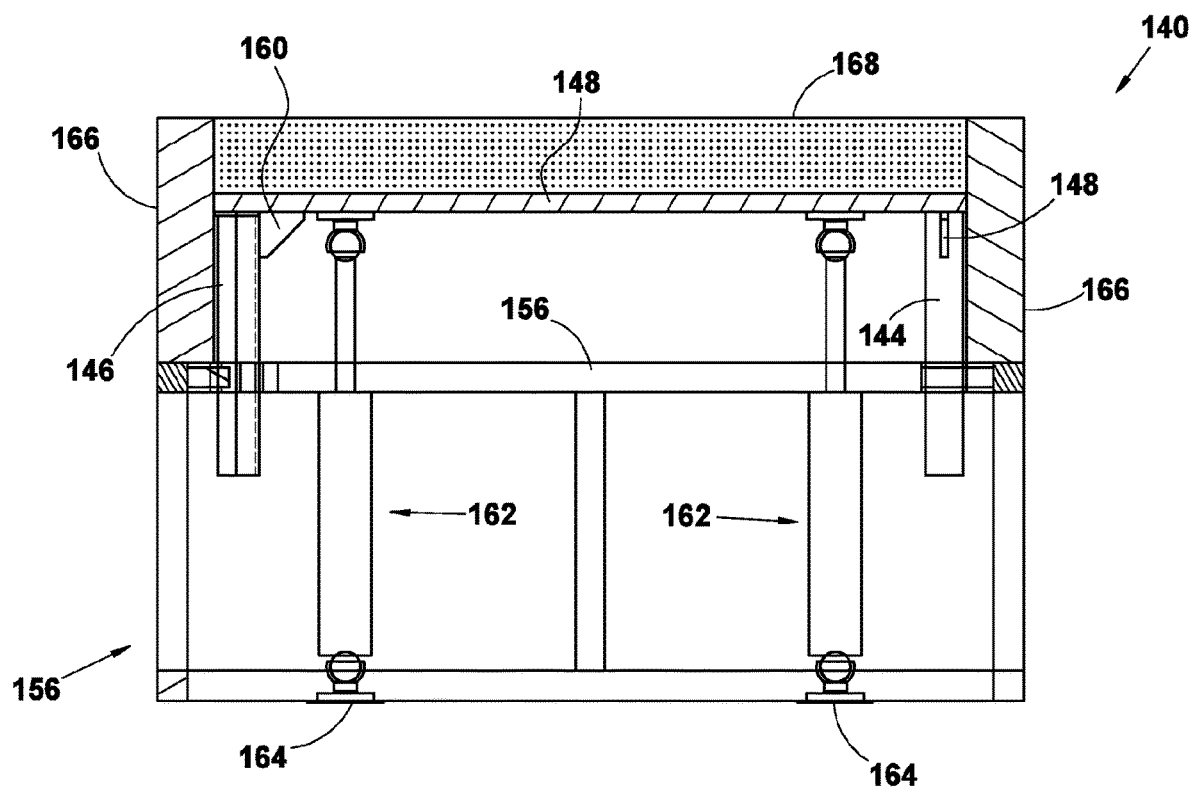
FIG. 24 shows a sectional view of the build platform guiding arrangement, frame and material retaining unit of FIG. 22, taken along the line C-C in FIG. 23, wherein a material bed is also shown.

The Inventors have found that the configuration described with reference to FIGS. 20 and 21 may obviate the need for a secondary build platform, at least in some applications. This aspect is illustrated in FIGS. 22 to 24, in which a set of angularly displaceable linear actuators 162 are shown as being mounted directly to the bottom 163 of the build platform 148 and to a base 164 of the frame 156. FIGS. 22 to 24 also illustrate a conventional material retaining unit 166 and a material bed 168 retained by the material retaining unit 168 (only in FIG. 24).

The Inventors believe that the guiding arrangement of the present invention provides numerous advantages.

An arrangement is provided by which a build platform can be guided and actuated in such a manner that it is substantially unaffected by thermal expansion. The Inventors believe that the arrangement is suitable for use with relatively large build platforms and in relatively high temperature applications.

The Inventors have found that the present invention provides an effective technique for supporting a build platform of an additive manufacturing apparatus in a manner which compensates for thermal expansion of the build platform. Specifically, a vertical guide is provided at a periphery of the build platform along which the build platform is displaceable, and angular displacement of the build platform about the vertical guide is substantially inhibited whilst at the same time permitting unconstrained expansion and contraction of the build platform. This permits an additive manufacturing apparatus to handle high levels of preheating as it allows for substantial thermal expansion without imposing significant forces on the build platform and guide and/or actuation systems.

It is believed that the mounting element (e.g. the pillar 20) provides a useful fixed reference point which is not affected by thermal expansion.

The present invention provides a displacement arrangement capable of compensating for thermal expansion or contraction of the build platform to maintain the build platform in a generally parallel orientation relative to the X-Y plane. Specifically, the linear actuators described herein, or components thereof, are angularly displaceable relative to a support structure of the additive manufacturing apparatus and the build platform to compensate for relative lateral movement between ends of the actuators as a result of differential thermal expansion or contraction of the build platform and the support structure.

The Inventors have found that the use of a secondary build platform may be advantageous in that it obviates the risk of the actuators interfering with the material retaining unit and permits the use of so-called "hanging" actuators, i.e. actuators that function under tension instead of compression. Embodiments of the invention, however, employ only a single, primary build platform.

The linear actuators may also serve to prevent significant angular displacement of the build platform.

It is envisaged that a number of different types of actuators may be used, including ball screws and roller screws.

The invention claimed is:

1. An additive manufacturing apparatus which includes a build platform which is configured to be displaced along a vertical or Z-axis of the additive manufacturing apparatus and a build platform guiding arrangement including:
   mounting means mounted at a first corner region of the build platform in a horizontal or X-Y plane defined by an X-axis and a Y-axis of the additive manufacturing apparatus, wherein the mounting means is configured operatively to permit displacement of the build platform along the Z-axis and prevent substantial linear displacement of the build platform along the X-axis and/or the Y-axis relative to the mounting means; and
   guiding means including two linear guides, each located adjacent to a respective corner region of the build platform, a first of the linear guides is mounted at a second corner region on a side of the build platform adjacent to the first corner region, and a second of the linear guides being mounted at a third corner region on another side of the build platform adjacent to the first corner region, each linear guide being fixedly mounted in the additive manufacturing apparatus, and further including a surface plate provided on the side surface of the build platform, the surface plate being configured to mate with a corresponding linear guide in a sliding fashion, in use, an interface between the linear guide and its corresponding surface plate being aligned with a centre of the mounting means along the X-axis or Y-axis, the centre of the mounting means being a centre point of the guide pillar in the X-Y plane so as operatively to permit unconstrained thermal expansion and contraction of the build platform in the X-Y plane and prevent substantial angular displacement of the build platform about the Z-axis in the X-Y plane.

2. An additive manufacturing apparatus as claimed in claim 1, in which the mounting means includes a pillar which operatively extends along the Z-axis of the additive manufacturing apparatus.

3. An additive manufacturing apparatus as claimed in claim 1, in which the mounting means is a mounting arrangement provided by a pillar and bush arrangement or pillar and bearing arrangement by which the build platform is mounted in the additive manufacturing apparatus in order to prevent the build platform from being displaced in the X-Y plane relative to the mounting arrangement.

4. An additive manufacturing apparatus as claimed in claim 3, in which the pillar is fixedly mounted in the additive manufacturing apparatus, with the bush being mounted to the build platform and being configured to be displaced along the pillar together with the build platform.

5. An additive manufacturing apparatus as claimed in claim 3, in which the bush is fixedly mounted in the additive manufacturing apparatus, with the pillar configured to be displaced along with the build platform.

6. An additive manufacturing apparatus as claimed in claim 3, in which the build platform is generally rectangular in the X-Y plane, the mounting means being positioned at a corner or corner region of the build platform.

7. An additive manufacturing apparatus as claimed in claim 1, in which the surface plate is fixedly mounted in the additive manufacturing apparatus, with the linear guide configured to be displaced along with the build platform.

8. An additive manufacturing apparatus as claimed in claim 1, which further includes a displacement arrangement configured to displace the build platform along the Z-axis of the additive manufacturing apparatus, the displacement arrangement including at least two spaced apart linear actuators, the linear actuators being angularly displaceable and/or include angularly displaceable components in order operatively to compensate for thermal expansion or contraction of the build platform to maintain the build platform in a generally parallel orientation relative to the X-Y plane, one or both ends of each linear actuator including or being mounted to angularly displaceable joints.

9. An additive manufacturing apparatus as claimed in claim 8, in which a first end of each linear actuator is mounted to a support structure such as a lower region of the additive manufacturing apparatus, and a second end of each linear actuator is connected to the build platform.

10. An additive manufacturing apparatus as claimed in claim 9, in which the second end of the linear actuator protrudes above the build platform, with a side of the linear actuator being attached to the build platform by way of an angularly displaceable component.

11. An additive manufacturing apparatus as claimed in claim 8, in which the build platform is a primary build platform which defines a working area of the additive manufacturing apparatus, in use.

12. An additive manufacturing apparatus as claimed in claim 8, in which the build platform is a secondary build platform which is mounted or mountable to a primary build platform, the linear actuators being directly coupled to the secondary build platform and being configured to displace the primary build platform by displacing the secondary build platform.

13. An additive manufacturing apparatus as claimed in claim 12, in which the primary build platform has dimensions different from the dimensions of the secondary build platform.

14. An additive manufacturing apparatus as claimed in claim 11, having a material retaining unit which includes a plurality of walls which are configured to conform closely to outer side edges of the primary build platform so as to retain a material bed operatively deposited in the working area defined by the primary build platform.

* * * * *